United States Patent [19]
Dowe

[11] Patent Number: 6,043,625
[45] Date of Patent: Mar. 28, 2000

[54] BATTERY CHARGING SYSTEM WITH BATTERY TYPE AND POLARITY DISCRIMINATION

[75] Inventor: David R. Dowe, Rochester, N.Y.

[73] Assignee: Eastman Kodak Company, Rochester, N.Y.

[21] Appl. No.: 08/099,277

[22] Filed: Jul. 29, 1993

[51] Int. Cl.[7] .............................................. H01M 10/46
[52] U.S. Cl. ........................ 320/106; 320/165; 320/110
[58] Field of Search ................................. 320/2, 15, 25, 320/26, 48, 106, 110, 116, 119, 165

[56] References Cited

U.S. PATENT DOCUMENTS

| | | | |
|---|---|---|---|
| 3,470,440 | 9/1969 | Rheingold et al. | 320/25 |
| 3,781,631 | 12/1973 | Nelson et al. | 320/25 |
| 3,800,209 | 3/1974 | Minear | 320/25 |
| 3,809,993 | 5/1974 | Wheeler | 320/25 |
| 4,144,483 | 3/1979 | Thornley | 320/25 |
| 4,320,334 | 3/1982 | Davis et al. | 320/48 |
| 4,441,066 | 4/1984 | Burmenko | 320/48 |
| 4,467,265 | 8/1984 | Hierholzer, Jr. | 320/17 |
| 4,536,757 | 8/1985 | Ijntema | 340/636 |
| 4,546,302 | 10/1985 | Smith | 320/25 |
| 4,571,533 | 2/1986 | Dey | 320/25 |
| 4,577,144 | 3/1986 | Hodgman et al. | 320/2 |
| 4,577,145 | 3/1986 | Mullersman | 320/2 |
| 4,628,243 | 12/1986 | Hodgman et al. | 320/2 |
| 4,680,528 | 7/1987 | Mikami et al. | 320/32 |
| 5,017,856 | 5/1991 | Johnson, Jr. | 320/2 |
| 5,049,803 | 9/1991 | Palanisamy | 320/20 |
| 5,057,761 | 10/1991 | Felegyhazi, Sr. | 320/2 |
| 5,162,721 | 11/1992 | Sato | 320/15 |
| 5,184,059 | 2/1993 | Patino et al. | 320/15 |
| 5,680,027 | 10/1997 | Hiratsuka et al. | 320/2 |
| 5,742,149 | 4/1998 | Simpson | 320/113 |
| 5,760,587 | 1/1998 | Harvey | 324/424 |
| 5,780,992 | 7/1998 | Beard | 320/106 |

FOREIGN PATENT DOCUMENTS

| | | |
|---|---|---|
| 0 394 074 | 4/1990 | European Pat. Off. . |
| 60-194387 | 10/1985 | Japan . |
| 3-103034 | 4/1991 | Japan . |

*Primary Examiner*—Nicholas Ponomarenko
*Attorney, Agent, or Firm*—Francis H. Boos, Jr.

[57] ABSTRACT

A battery charging system detects if multiple battery cells to be recharged include rechargeable, secondary batteries or non-rechargeable, primary batteries. If the system detects that any one of the cells is a primary battery, then the charging system halts the charging operation. If all of the cells are secondary batteries, but the polarity of any battery cell is incorrect, then the charging system halts the charging process.

12 Claims, 2 Drawing Sheets

BATTERY CHARGING SYSTEM WITH BATTERY TYPE AND POLARITY DISCRIMINATION

BACKGROUND OF THE INVENTION

1. Field of the Invention

This invention relates to rechargeable batteries and, more particularly, to systems for charging of rechargeable batteries and preventing charging of non-rechargeable batteries.

2. Description of the Related Art

Most conventional battery-operated consumer products utilize non-rechargeable, or primary, batteries that are available in standard battery cell sizes. Primary batteries are batteries such as carbon-zinc or alkaline batteries that must be discarded when fully discharged. Rechargeable, or secondary, batteries are batteries such as nickel-cadmium batteries that can be repeatedly charged and discharged for a significant number of cycles before they must be discarded. Most primary batteries, if subjected to the charging current provided by a charging circuit, will become damaged and will possibly damage the product or device in which the battery is placed.

Traditionally, secondary batteries have been constructed with terminals and case configurations and sizes that are incompatible with the primary batteries that can be obtained by retail customers. More recently, secondary batteries have become available with terminals and in configurations and sizes identical to those of standard primary batteries. That is, primary and secondary batteries are no longer physically distinguishable and are now interchangeable. This interchangeability makes it easy for a consumer to inadvertently place a primary battery into either a product with a battery charging circuit or a dedicated battery charger device with a charging circuit and then inadvertently attempt to recharge the primary battery.

Efforts have been underway to prevent such inadvertent charging of primary batteries. For example, U.S. Pat. No. 4,577,144 to Hodgman et al., describes a battery charger that electrically determines if a battery cell being recharged is a primary battery or a secondary battery. Charging of a primary battery cell is inhibited and charging of a secondary battery cell is permitted.

Battery chargers that electrically discriminate between a primary battery cell and a secondary battery cell incorporate a desirable safeguard, but generally are configured for recharging only a single battery cell at a time. It would be advantageous if chargers that electrically discriminate between primary and secondary batteries could recharge more than one cell at a time. The ability to charge multiple battery cells simultaneously, however, introduces the possibility of installing a mixture of primary and secondary batteries into a charging circuit. If the user attempted to charge the mixture, damage to all of the batteries could occur. Present chargers are not configured electrically to detect a mixture of primary and secondary battery cells.

It also would be advantageous to electrically determine if a battery cell were installed in a charging circuit with the incorrect polarity. Incorrect polarity also can damage battery cells. The ability to charge multiple battery cells simultaneously also introduces the possibility of installing secondary batteries with mixed polarity. Thus, it would be advantageous to charge multiple battery cells simultaneously without risking damage to the batteries or the associated product or charger due to mixing types of batteries or installing with incorrect polarities.

From the description above, it should be apparent that there is a need to provide a battery charging system that recharges multiple secondary battery cells simultaneously and prevents charging primary battery cells mixed in with secondary battery cells and prevents charging battery cells installed with incorrect polarities. The present invention satisfies this need.

SUMMARY OF THE INVENTION

In accordance with the present invention, a battery charging system, adapted to receive one or more battery cells having first and second electrical contacts, includes a battery charging circuit having first and second terminals coupled to the contacts of the battery cell(s) and operating in a charging mode and a non-charging mode, a battery discriminating circuit that detects the voltage across the battery cell(s) during the charging mode to place the charging circuit in the non-charging mode if the detected voltage indicates a primary battery cell is present, and includes a battery polarity discriminating circuit, coupled to the charging circuit, that electrically detects when the first and second contacts of the battery cell(s) are connected with the incorrect polarity to the first and second terminals of the battery charging circuit and operates the battery charging circuit in the non-charging mode.

The battery charging system can be advantageously included within a charging cradle that mates with a product containing a plurality of rechargeable battery cells. The charging system detects if the user is attempting to charge primary batteries or secondary batteries and detects if the battery cells are installed with the correct polarity. If primary batteries are indicated, then charging is halted. If secondary batteries are indicated, but polarity is incorrect, then charging is halted and an indicating signal is produced.

Other features and advantages of the present invention should be apparent from the following description of the preferred embodiment, which illustrates, by way of example, the principles of the invention.

DESCRIPTION OF THE PREFERRED EMBODIMENT

Figure 1:
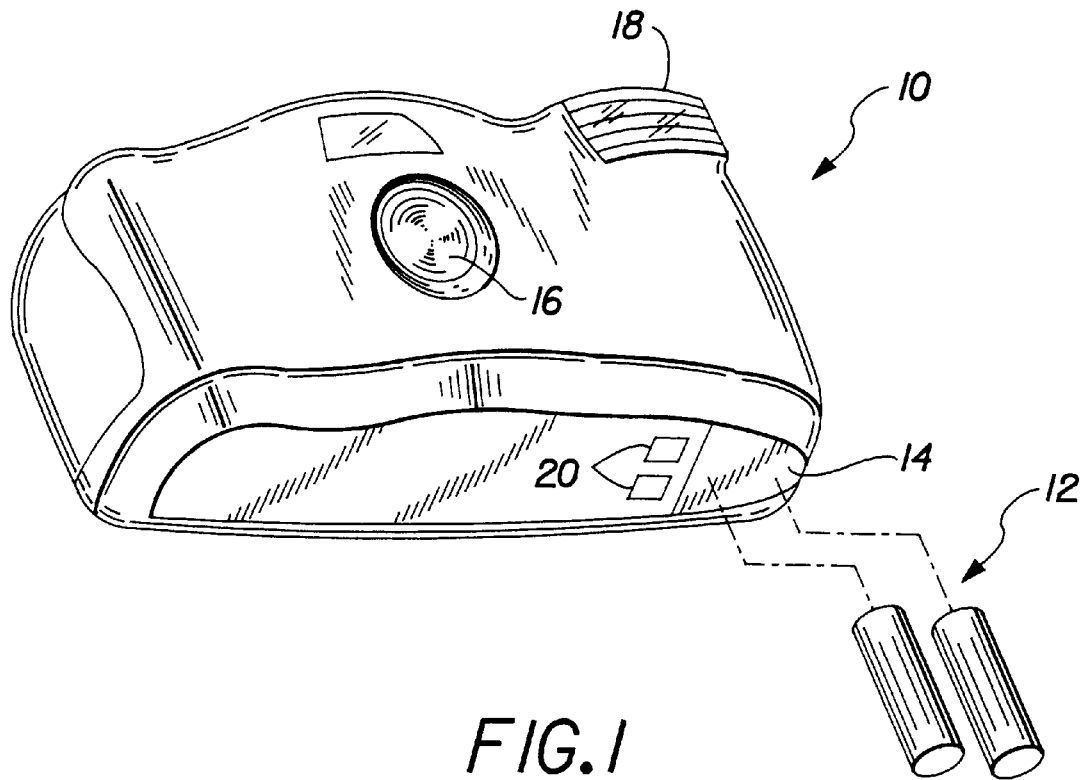
FIG. 1 is a perspective view of a product that accepts secondary battery cells for charging.
Figure 2:
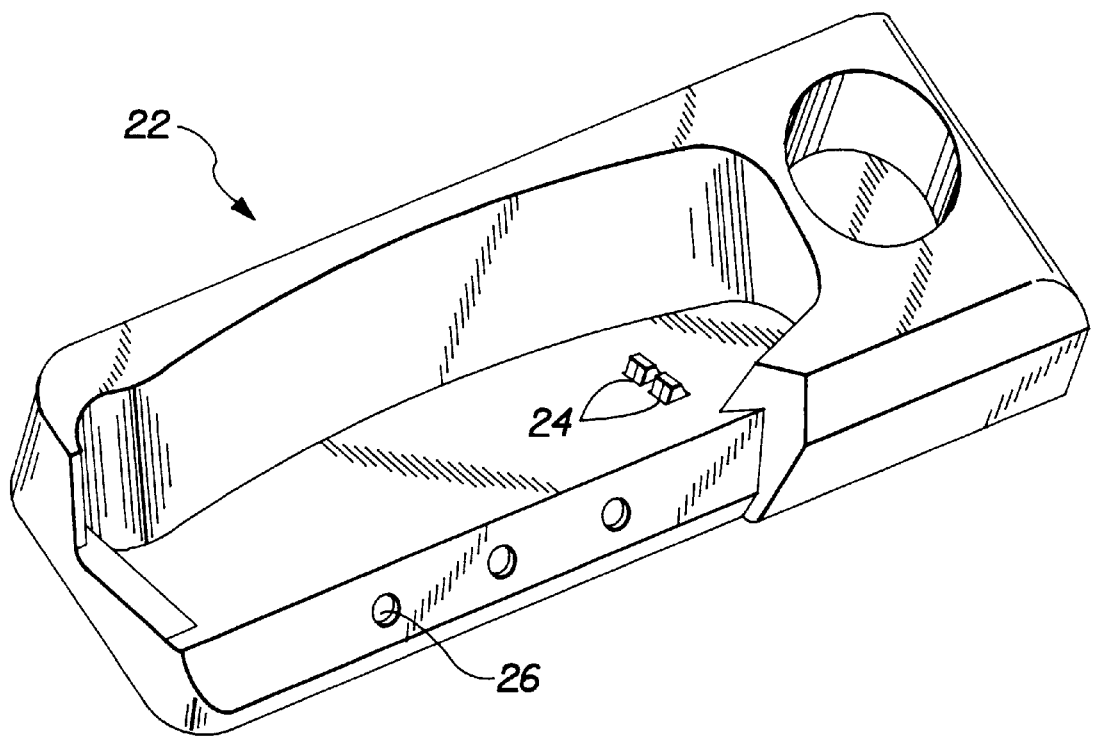
FIG. 2 is a perspective view of a charging system constructed in accordance with the present invention and adapted to mate with the product illustrated in FIG. 1.

A charging system in accordance with the present invention can be incorporated into a dedicated battery charger or can be part of a product/charger combination including a product that accepts secondary, or rechargeable, battery cells and a specially designed charging cradle that mates with the product. FIG. 1 and FIG. 2 illustrate a charging system embodied in a camera 10/charging cradle 22 combination constructed in accordance with the present invention. FIG. 1 shows a camera 10 that receives battery cells 12 in a battery receiving well located on the underside of the camera, shown covered by an access door 14. The camera produces photographs through an objective lens 16 and includes, for example, an electronic flash unit 18 that receives power from the battery cells 12. The camera 10 includes a pair of electrical contacts 20 through which a charging current can be delivered to the battery cells. The camera 10 mates with a charging cradle 22, which includes a pair of electrical terminals 24 that are coupled to the camera electrical contacts 20 when the camera is mated with the cradle 22. The operating status of the charging system is indicated by an indicator light 26 on the charging cradle. When the camera 10 is mated with the charging cradle 22, the charging circuitry contained in the cradle determines if the battery cells 12 are primary or secondary batteries. If any one of the battery cells is a primary battery, then the system does not proceed with charging and the indicator light 26 flashes on and off. If all of the battery cells are secondary batteries, but any one of the cells is installed with incorrect polarity, then the system does not proceed with charging and the indicator light 26 is not illuminated. If the battery cells are secondary batteries and are properly installed with the correct polarity, then the system proceeds with charging and the indicator light 26 is steadily illuminated. In this way, the charging system 10, 22 detects primary and secondary batteries, detects correct polarity, and permits charging to proceed only if all battery cells are secondary batteries and are installed with the correct polarity.

Figure 3:
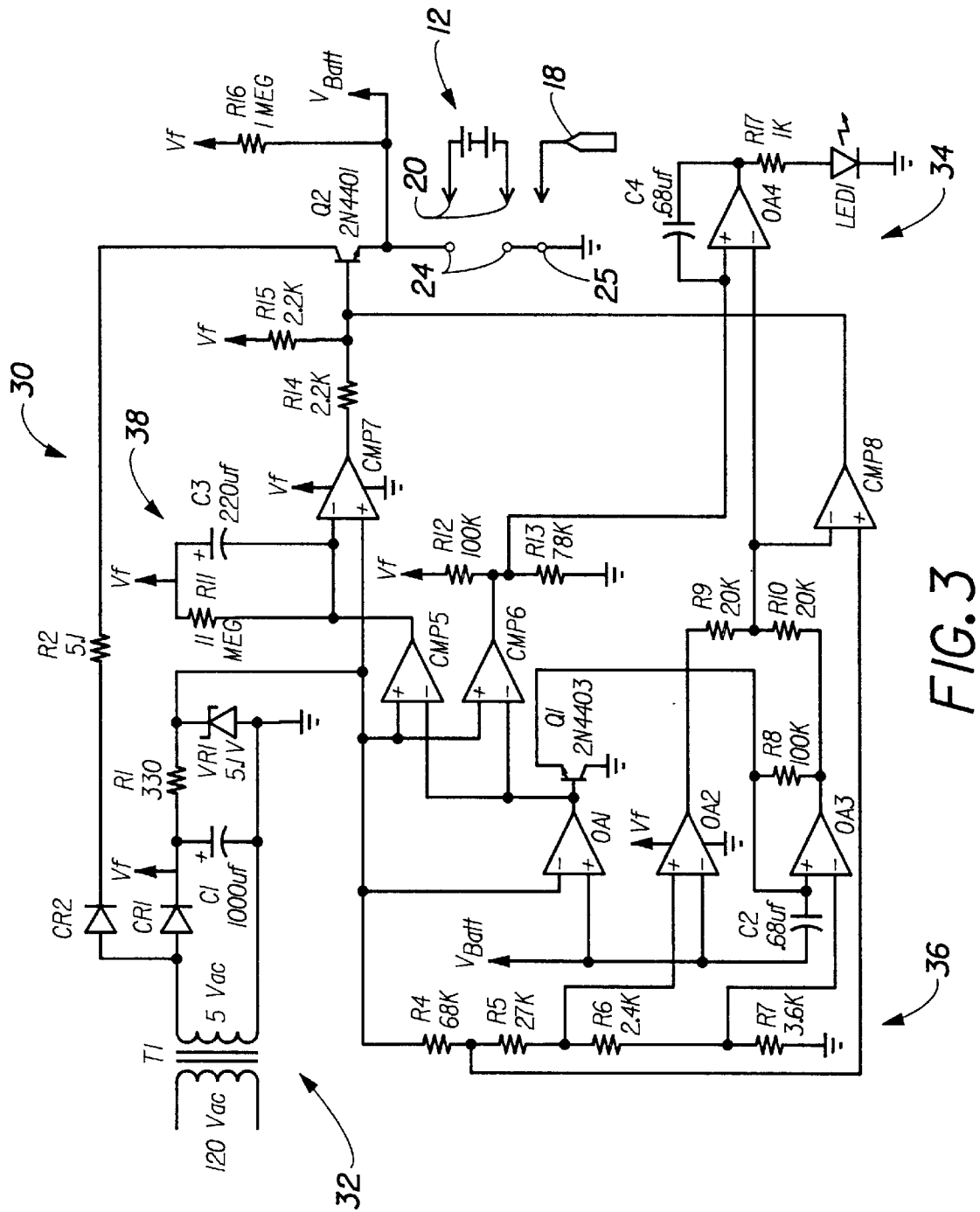
FIG. 3 is a schematic diagram of the charging system illustrated in FIG. 2.

FIG. 3 is a schematic diagram of a charging system 30 constructed in accordance with the present invention. The numerical values shown adjacent the resistors are the resistance values, in ohms, of the preferred embodiment and therefore are exemplary only. With respect to the exemplary camera 10 and charging cradle 22 combination illustrated in FIG. 1 and FIG. 2, the battery cells 12 to be charged are electrically connected to the camera contacts 20, which are then engaged with the charging cradle terminals 24. The electrical connection to the flash unit 18 also is represented in FIG. 3 by an additional terminal 25. Electrical power is produced for the charging system 30 by typical household voltage of 120 volts AC (120 VAC). It is to be understood that other supply voltages also can be used with appropriate circuit changes known to those skilled in the art. The electrical power is provided to a transformer circuit 32 including a transformer T1 that changes the household voltage to 5.8 VAC. This voltage is rectified into a direct current via two diodes, CR1 and CR2. The voltage from the first diode, diode CR1, is filtered by a capacitor C1 and supplies electrical power $V_f$ at a level of approximately 8.2 volts to the remainder of the charging system, which comprises a charging circuit 34. A resistor R1 and a zener diode VR1 provide a reference voltage $V_z$ of 5.1 volts used for control purposes as described further below. The rectified voltage from the second diode, diode CR2, is current-limited by a resistor R2 and supplies electrical charging power to the battery cells 12 through a transistor Q2. The transistor Q2 is, for example, a 2N4401 transistor obtainable from Texas Instruments. The voltage across the battery cells when they are connected to the charging circuitry is represented by $V_{batt}$.

The charging circuitry 34 includes four operational amplifiers OA1, OA2, OA3, and OA4 that act as switching devices. The first operational amplifier OA1 is used as a master reset switch. The output of OA1 goes to a high state (8.2 volts) at any time that the battery voltage, $V_{batt}$, is higher than the zener reference voltage $V_z$ (5.1 volts). A high output state for OA1 resets the third operational amplifier, OA3, by driving the positive input terminal of OA3 high. The charging circuitry 30 also includes four voltage comparators, CMP5, CMP6, CMP7, and CMP8. CMP5 and CMP6 also are reset by a high output state from OA1 by having their negative input terminals driven high. A resistive network 36 having four resistors R4, R5, R6, and R7 is supplied with the zener diode reference voltage $V_z$ and produces a set of secondary reference voltages that are determined in accordance with battery cells 12 that are assumed to have a fully-charged voltage of 1.5 volts each.

The second operational amplifier OA2 is used as a reverse polarity detector. If the battery voltage $V_{batt}$ falls below an R5–R6 secondary reference voltage obtained from between resistors R5 and R6 of the resistive network 36 as shown, then OA2 will switch from a low output state to a high output state. The third operational amplifier OA3 is used as a battery type detector. The positive input terminal of OA3 is coupled to the battery voltage $V_{batt}$ through a capacitor C2. The negative input terminal of OA3 is coupled to an R6–R7 reference voltage obtained from between resistors R6 and R7 of the resistive network 36 as shown in FIG. 3. If the R6–R7 reference voltage from the resistive network is greater than the battery voltage, then OA3 will switch from a low output state to a high output state.

The voltage comparator CMP8 is used to monitor the output signals from OA2 and OA3. If either OA2 or OA3 switches from a low output state to a high output state, then CMP8 will detect a voltage that is higher than an R4–R5 reference voltage obtained from between resistors R4 and R5 of the resistive network 36 as shown in FIG. 3 and the output of CMP8 will be shorted to ground. If OA2 and OA3 are both in a low output state, then CMP8 will detect a voltage lower than the fourth reference voltage from the resistive network, and the output from CMP8 will be left open-circuited. When the output of CMP8 is open-circuited, the base of the transistor Q2 will be at a positive voltage potential, as determined by resistors R14 and R15. This positive potential permits the transistor Q2 to conduct current from the second resistor R2 to the battery cells 12, which are thereby charged. If the output of CMP8 is shorted to ground, then the base of the transistor Q2 is held in a low state and Q2 therefore is an off condition, halting any charging.

The voltage comparator CMP5 is used to reset an RC timing network 38 comprising a resistor R11 and a capacitor C3. If the output signal of OA1 is in a high state, then the zener diode reference voltage $V_z$ maintains CMP5 in a grounded output condition, which permits the capacitor C3 to be charged. When the output of OA1 goes to a low output state, then the output of CMP5 is open-circuited. This permits the capacitor C3 to discharge through the resistor R11. The voltage comparator CMP7 monitors the voltage at the resistor R11 and capacitor C3. If the voltage at R11 and C3 falls below the zener diode reference voltage, then CMP7 will be in an open-circuited condition. If the monitored voltage of R11 and C3 goes above the zener diode reference voltage $V_z$, then the output of the voltage comparator CMP7 is shorted to ground. With the outputs of both voltage comparators CMP7 and CMP8 open-circuited, the base of the transistor Q2 reaches its most positive value through a resistor R15. With the output of CMP7 shorted to ground and the output of CMP8 open-circuited, the base of the transistor Q2 is at less than its maximum positive value, as determined by the two resistors R14 and R15. The output of the voltage comparator CMP6 is shorted to ground if the output of OA1 is in a high output state. The output of CMP6 is permitted to float to a predetermined value, set by resistors R12 and R13, if the output of OA1 is in a low state. Finally, OA4 is used to drive an indicating light, such as LED1, and is controlled by the voltage comparator CMP6 and the combined outputs of OA2 and OA3.

If any one of the battery cells 12 is a non-rechargeable primary battery, then the operational amplifier OA3 will detect a higher AC-coupled battery voltage $V_{batt}$ than the R6–R7 reference voltage from the resistive network 36. That is, the values of the resistors R4–R7 are selected so the R6–R7 reference voltage, as shown in FIG. 3, discriminates between all of the battery cells 12 being secondary batteries and any one of the cells being a primary battery. The resistance values shown in FIG. 3 provide this discrimination. The high $V_{batt}$ causes OA3 to switch to a high output state for the positive portion of the AC cycle. A resistor R8 provides positive feedback to the positive input terminal of OA3, which causes OA3 to remain locked in that high output state and ignore AC cycle fluctuations. The only way to clear this locked situation is to remove the battery cells 12 from the charging circuit, thus resetting OA1 to a low output state. As OA3 switches to a high output state, the second operational amplifier OA2 has switched to a low output state. This in turn causes the fourth operational amplifier OA4 to oscillate output states due to the charging and discharging of the capacitor C4. Therefore, the signal indicator LED1 will blink on and off at a rate determined by C4, R12, and R13. In addition, the voltage comparator CMP8 will switch to a grounded output condition, thereby shutting off the transistor Q2 by pulling the base of the transistor to ground and shutting off any charging.

If one or more of the battery cells 12 is reversed from its correct polarity in the charging circuit, then the second operational amplifier OA2 will detect a lower battery voltage $V_{batt}$ than the R5–R6 reference voltage supplied from the resistive network 36. That is, the values of the resistors R4–R7 are selected as shown in FIG. 3 to discriminate between all of the battery cells being installed with the correct polarity and any one of the cells being installed with the incorrect polarity. The resistance values shown in FIG. 3 achieve this discrimination. As a result of $V_{batt}$ being lower than the R5–R6 reference voltage, OA2 will switch to a high output state. If OA2 is in a high output state, then CMP8 will switch to a grounded output state and will shut off the transistor Q2 by pulling the base of the transistor to ground. Charging will be halted. At the same time, OA3 will switch to a high output state, causing OA4 to switch to a low output state. Therefore, LED1 will not be illuminated.

If the battery cells 12 are rechargeable secondary batteries and polarity is correct, then OA1 permits normal operation of the charging circuitry. If the battery voltage $V_{batt}$ rises above the R5–R6 reference voltage from the resistive network 36, then the OA2 output signal stays in a low output state. If $V_{batt}$ also does not rise above the R6–R7 reference voltage from the resistive network, then the OA3 output signal will stay in a low output state. The combination of outputs from OA2 and OA3 will switch OA4 to a high output state and therefore the indicating light LED1 will be steadily illuminated through a current-limiting resistor R17.

In another aspect of the present invention, a quick charge cycle is followed by a trickle charge cycle, which most efficiently charges secondary batteries. When the charging cycle is begun, the capacitor C3 is charged and begins to discharge through the resistor R11. The output signal of the voltage comparator CMP7 is held in an open condition while the capacitor C3 is discharging. This permits the maximum positive potential to be applied to the base of the transistor Q2 through the resistor R15, thereby providing a maximum current to the battery cells 12. When the capacitor C3 has discharged to a voltage level that is higher than the zener diode reference voltage level, then the output of CMP7 switches to a grounded condition. This in turn reduces the positive potential applied to the base of the transistor Q2, thereby permitting a trickle charge of less than the maximum charge current to be applied to the battery cells.

In summary, if non-rechargeable primary batteries are installed into the camera 10 when the camera is placed onto the charging cradle 22, then the third operational amplifier OA3 switches to a high output state as described above and the output of the voltage comparator CMP8 goes to a grounded condition, turning off the transistor Q2. This halts the charging of the battery cells 12 and flashes the indicating light LED1 on and off. If rechargeable secondary batteries are installed in the camera 10 when the camera is placed onto the charging cradle, but one or more battery cells is installed with the incorrect polarity, then the light LED1 is not illuminated. If all cells are installed with the correct polarity, then the third operational amplifier OA3 stays in a low output state and the output of CMP8 stays in an open-circuited condition, permitting the transistor Q2 to pass current determined by the resistors R14 and R15. This permits charging of the battery cells 12 and steadily illuminates the indicating light LED1. In addition, CMP7 permits a one-hour quick charging cycle and then reduces the current being passed through the transistor Q2 for a trickle charge, as described above.

It is to be understood that the charging circuitry described and illustrated in FIG. 3 can be embodied in a dedicated battery charger rather than a camera/charging cradle combination. Other alternatives, as well as alternative details of configuration, will occur to those skilled in the art. For example, the operational amplifiers OA1 through OA4 can be obtained in a single chip package LM 324 obtainable from National Semiconductor, Inc. and the comparators CMP5 through CMP8 can be obtained in a single chip package LM 339, also obtainable from National Semiconductor, Inc., but alternative packages and arrangements will occur to those skilled in the art. Similarly, the transistors Q1 and Q2 can be obtained from Texas Instruments, Inc.

Thus, the present invention provides relatively simple charging circuitry that electrically detects whether multiple battery cells connected to the charging circuitry include one or more non-rechargeable primary batteries, in which case charging is halted. The charging circuitry also detects if one or more of the battery cells are installed with the incorrect polarity. Again, charging is halted. In this way, charging circuitry in accordance with the invention prevents damage to batteries, the product in which the batteries are installed, and the charging circuitry.

The present invention has been described above in terms of a presently preferred embodiment so that an understanding of the present invention can be conveyed. There are, however, many configurations for charging systems not specifically described herein, but with which the present invention is applicable. The present invention therefore should not be seen as limited to the particular embodiment described herein, but rather, it should be understood that the present invention has wide applicability with respect to charging systems generally. All modifications, variations, or equivalent arrangements that are within the scope of the attached claims should therefore be considered to be within the scope of the invention.

The following elements and their corresponding reference numerals are used in the drawings:

camera 10
battery cells 12
access door 14

-continued objective lens 16
electronic flash unit 18
electrical contacts 20
charging cradle 22
electrical terminals 24
additional terminal 25
indicator light 26
charging system 30
transformer circuit 32
charging circuit 34
resistive network 36
RC timing network 38
capacitor C1
capacitor C2
capacitor C3
capacitor C4
diode CR1
diode CR2
indicating light LED1
operational amplifier OA1
operational amplifier OA2
operational amplifier OA3
operational amplifier OA4
resistor R1
resistor R2
resistor R4
resistor R5
resistor R6
resistor R7
resistor R8
resistor R11
resistor R12
resistor R13
resistor R14
resistor R15
resistor R17
transformer T1
transistor Q1
transistor Q2
voltage comparator CMP5
voltage comparator CMP6
voltage comparator CMP7
voltage comparator CMP8
zener diode VR1

I claim:

1. A multiple battery charging system comprising:
a battery receiving well adapted to receive a plurality of separate batteries capable of including a mixture of primary and secondary batteries having the same size and shape devoid of external physical and electrical characteristics indicative of battery type, the well having first and second electrical contacts that define a battery voltage across the plurality of batteries;
a transformer circuit that produces a transformer reference voltage and an output charging current for simultaneously charging the separate batteries;
a reference network that produces a plurality of reference network voltages in response to the transformer reference voltage;
a reverse polarity detector circuit that determines if the battery voltage is of correct polarity but less than a first predetermined one of the reference network voltages, thereby indicating at least one of the batteries was received in the battery receiving well with an incorrect electrical polarity;
a battery type discriminating circuit that determines if the battery voltage is greater than a second predetermined one of the reference network voltages, thereby indicating at least one of the batteries in the receiving well is not a rechargeable battery cell; and
a charging circuit coupled to the transformer circuit and to the batteries that operates in a non-charging mode if the reverse polarity detector circuit determines that at least one of the batteries was received in the battery receiving well with an incorrect polarity or if the battery type discriminating circuit determines that at least one of the batteries is not a rechargeable battery and otherwise operates in a charging mode for charging the batteries.

2. A multiple battery charging system as defined in claim 1, wherein the reference network comprises a resistive network.

3. A multiple battery charging system as defined in claim 1, further including:
a charging indicator light that is steadily illuminated if the batteries are being recharged, is not illuminated if the reverse polarity detector determines that the battery voltage is less than the first predetermined reference network voltage, and is alternately illuminated on and off if the battery type discriminating circuit determines that the battery voltage is greater than the second predetermined reference network voltage.

4. A multiple battery charging system as defined in claim 1, wherein the charging circuit remains in the non-charging mode if at least one of the batteries was not a rechargeable battery until the batteries are removed from the receiving well.

5. A multiple battery charging system as defined in claim 1, wherein the system comprises a charge device that includes the battery receiving well and a charging cradle that mates with the charge device and includes the transformer circuit.

6. A multiple battery charging system comprising:
a battery receiving well adapted to receive a plurality of batteries each of the same size and shape devoid of external physical and electrical characteristics indicative of battery type, the well having first and second electrical contacts that define a battery voltage across the batteries;
a transformer circuit that produces an output charging current and a primary reference voltage;
a resistive network that produces a plurality of secondary reference voltages;
a reverse polarity detector that determines if the battery voltage is of correct polarity but less than a first predetermined one of the secondary reference voltages, thereby indicating at least one of the batteries was received in the battery receiving well with an incorrect electrical polarity;
a battery type discriminating circuit that determines if the battery voltage is greater than a second predetermined one of the secondary reference voltages, thereby indicating at least one of the batteries in the receiving well is not a rechargeable battery cell; and
a charging circuit coupled to the transformer circuit and to the batteries that operates in a non-charging mode if the reverse polarity detector determines that at least one of the batteries was received in the battery receiving well with an incorrect polarity or if the battery type discriminating circuit determines that at least one of the batteries is not a rechargeable battery and otherwise operates in a charging mode for charging the batteries.

7. A multiple battery charging system as defined in claim 6, further including:
a master reset circuit that determines if the battery voltage is greater than the primary reference voltage and in response halts the charging mode.

8. A multiple battery charging system as defined in claim 7, wherein the master circuit comprises a single operational amplifier.

9. A multiple battery charging system as defined in claim 6, further including:

a charging indicator light that is steadily illuminated if the batteries are being recharged, is not illuminated if the reverse polarity detector determines that the battery voltage is less than the first predetermined secondary reference voltage, and is alternately illuminated on and off if the battery type discriminating circuit determines that the battery voltage is greater than the second predetermined secondary reference voltage.

10. A multiple battery charging system as defined in claim 6, wherein the charging circuit remains in the non-charging mode if at least one of the batteries was not a rechargeable battery until the batteries are removed from the receiving well.

11. A multiple battery charging system as defined in claim 6, wherein the reverse polarity detector comprises a single operational amplifier.

12. A multiple battery charging system as defined in claim 6, wherein the battery discriminator circuit comprises a single operational amplifier.

* * * * *